(12) United States Patent
Lee et al.

(10) Patent No.: US 8,232,779 B2
(45) Date of Patent: Jul. 31, 2012

(54) METHOD FOR SELECTING THE OPTIMUM NUMBER OF PHASES FOR CONVERTER AND SYSTEM USING THE SAME

(75) Inventors: Byoung-Kuk Lee, Yongin-si (KR); Jong-Soo Kim, Suwon-si (KR); Gyu-Yeong Choe, Siheung-si (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 568 days.

(21) Appl. No.: 12/388,492

(22) Filed: Feb. 18, 2009

(65) Prior Publication Data
US 2010/0124082 A1     May 20, 2010

(30) Foreign Application Priority Data

Nov. 14, 2008 (KR) ........................ 10-2008-0113637

(51) Int. Cl.
*G05F 1/00* (2006.01)
(52) U.S. Cl. ............. 323/213; 323/212; 363/45; 363/46
(58) Field of Classification Search .................. 323/212, 323/213; 363/45, 46
See application file for complete search history.

(56) References Cited

U.S. PATENT DOCUMENTS
2008/0094861 A1* 4/2008 Wang ........................ 363/21.11

OTHER PUBLICATIONS

Giral, Roberto et al., "Interleaved Converters Operation Based on CMC", IEEE Transactions on Power Electronics, vol. 14, No. 4, Jul. 1999, p. 643-652.*
Giral, Roberto et al., "Interleaved Converters Operation Based on CMC", IEEE Transactions on Power Electronics, vol. 14, No. 4, Jul. 1999, pp. 643-652.*
Choe, Gyu-Yeong, et al., "Design Consideration of Interleaved Converters for Fuel Cell Applications," Proceeding of International Conference on Electrical Machines and Systems 2007, Oct. 8-11, Seoul, Korea, pp. 238-243.

* cited by examiner

*Primary Examiner* — Adolf Berhane
*Assistant Examiner* — Lakaisha Jackson
(74) *Attorney, Agent, or Firm* — Blakely, Sokoloff, Taylor & Zafman LLP.

(57) ABSTRACT

A method for selecting the optimum number of phases for a converter is provided, which selects a duty range using an input voltage and an output voltage, obtains ripple values for multiple phases in the duty range, and selects the optimum number of phases using the corresponding ripple values. The method for selecting the optimum number of phases for a converter includes a duty range selection step of selecting a duty range using an input voltage and an output voltage, a ripple value calculation step of obtaining ripple values for multiple phases within the selected duty range, a range ripple selection step of selecting one or more phases in the duty range, and a rated ripple selection step of selecting the phases having the minimum ripple value in a rated duty among the phases selected in the range ripple selection step.

13 Claims, 9 Drawing Sheets

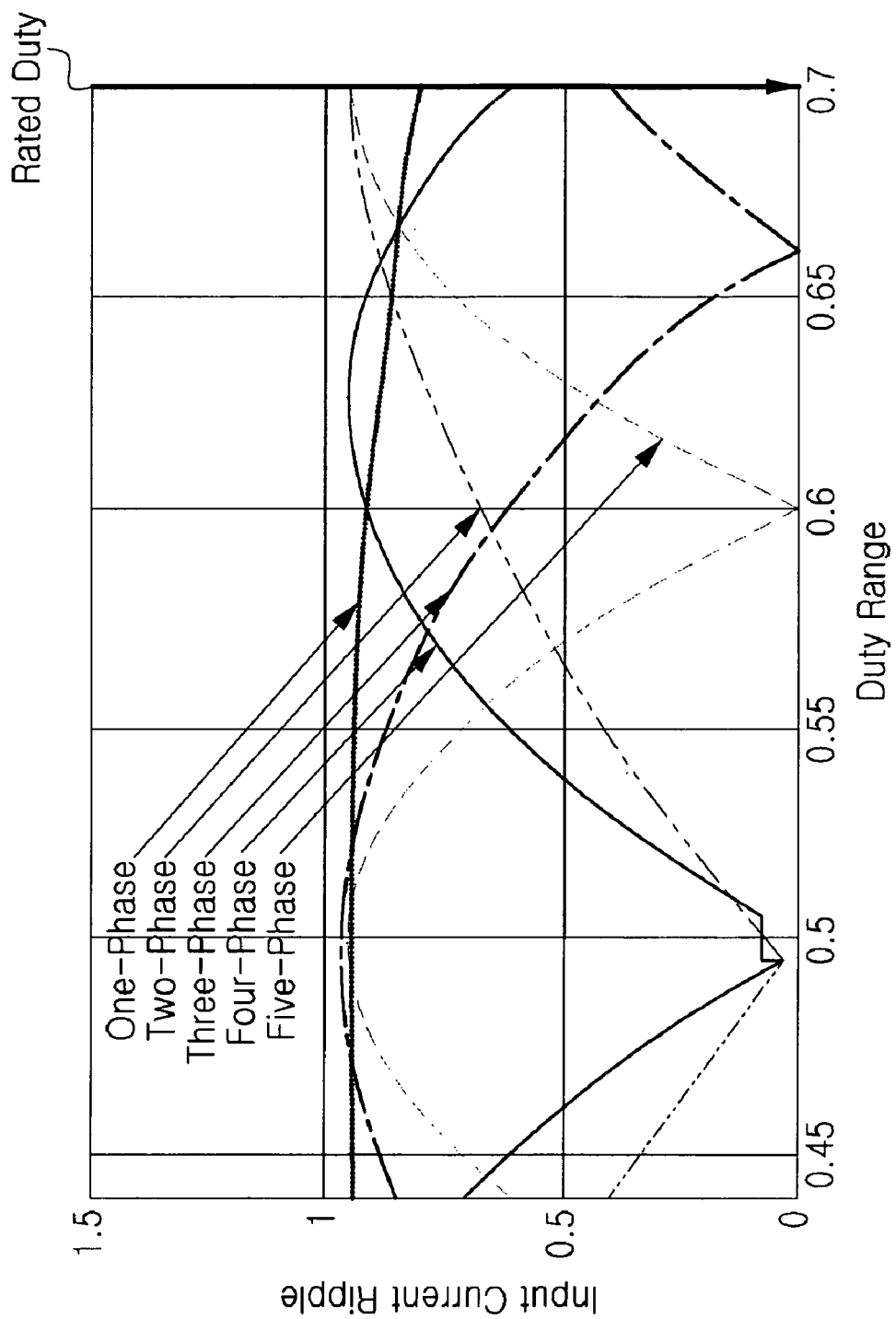

METHOD FOR SELECTING THE OPTIMUM NUMBER OF PHASES FOR CONVERTER AND SYSTEM USING THE SAME

BACKGROUND OF THE INVENTION

1. Field of the invention

The present invention relates to a method for selecting the optimum number of phases for a converter, and more particularly to a method for selecting the optimum number of phases for a converter and a system using the same, which selects a duty range using an input voltage and an output voltage, obtains ripple values for multiple phases in the duty range, and selects the optimum number of phases using the corresponding ripple values.

2. Description of the Prior Art

Recently, there has been a growing interest in environmentally friendly power generation due to the increase of power demand with an abrupt development of industry, environmental pollution problems caused by global warming, and the depletion of fossil fuels. Representative environmentally friendly power generation types are fuel cells, photovoltaics, and wind turbines. Particularly, since fuel cells do not have limited power generation resources, like sunlight and wind force, they are environmentally friendly, and make little noise in power generation, and they are viewed as a model technique for environmentally friendly power generation. Part of converting an output voltage of such fuel cells involves a DC-to-DC (DC/DC) converter and a DC-to-AC (DC/AC) inverter, and particularly to a boost converter that boosts a low voltage of the fuel cells up to a DC voltage of a specified level. Such a converter may be a single-phase converter or a multi-phase converter which is composed of multiple inductors and switch elements and uses one capacitor.

FIG. 1 is a view schematically illustrating the configuration of a conventional single-phase boost converter.

Referring to FIG. 1, the conventional single-phase boost converter includes an inductor 10 storing power of an input voltage, a capacitor 40 receiving and boosting the power supplied from the inductor 10 and outputting the boosted power to load directly or through an inverter, and a switch element 20 being turned on to store the supplied power of the input voltage in the inductor 10 and being turned off to make the capacitor 40 boost the power supplied from the inductor 10 and output the boosted power to the load directly or through the inverter.

The conventional single-phase boost converter also includes a diode element 30 preventing the current of an output terminal from flowing backward to an input terminal.

With reference to FIG. 2, the operation of the conventional single-phase boost converter will be described.

At the first time t1 when the switch element 20 is turned on, the power of the input voltage is stored in the inductor 10. Accordingly, a switch current IS, which gradually ascends as the power is stored in the inductor 10, flows through the switch element 20. Then, at the second time t2 when the switch element 20 is turned off, the power supplied from the inductor 10 is boosted by the capacitor 40, and the boosted power is supplied to the load directly or through the inverter.

Accordingly, a diode current ID, which gradually descends as the power stored in the inductor 10 is supplied to the capacitor 40, flows through the diode element 30. Through the above-described operation, an inductor current IL, which is the sum of the ascending switch current IS and the descending diode current ID, flows through the inductor 10. Accordingly, an inductor current ripple ΔIL is generated through the inductor by the ascending switch current IS and the descending diode current ID.

This ripple exerts a bad influence upon the system.

On the other hand, in addition to the single-phase converter as illustrated in FIG. 1, there is a multi-phase converter that is a parallel type boost converter configured to have multiple phases which have the same duty and a specified phase difference.

According to such a multi-phase converter, since input current ripples of respective phases have a specified phase difference even at a low switching frequency, the size of the whole input current ripples is decreased, and this causes the capacity and the size of the inductor to be reduced. Also, output voltage ripples are abruptly decreased due to the phase difference between the phases, and this causes the capacity and the size of the capacitor also to be abruptly reduced.

FIG. 3 schematically illustrates a three-phase converter as an example of a multi-phase converter.

As illustrated in FIG. 3, the three-phase inverter is provided with three inductors and three switch elements, and uses one capacitor.

As illustrated in FIG. 3, the general three-phase converter includes first to third inductors 112, 114, and 116 storing power of an input voltage, a capacitor 140 receiving and boosting the power from the first to third inductors 112, 114, and 116, and outputting the boosted power to load directly or through an inverter, a first switch element 122 being turned on to store the supplied power of the input voltage in the first inductor 112 and being turned off to make the capacitor 140 boost the power supplied from the first inductor 112 and output the boosted power to the load directly or through the inverter, a second switch element 124 being turned on to store power supplied from fuel cells in the second inductor 114 and being turned off to make the capacitor 140 boost the power supplied from the second inductor 114 and output the boosted power to the load directly or through the inverter, and a third switch element 126 being turned on to store the power supplied from the fuel cells in the third inductor 116 and being turned off to make the capacitor 140 boost the power supplied from the third inductor 116 and output the boosted power to the load directly or through the inverter.

The general three-phase converter also includes a first diode element 132 connected between the first inductor 112 preventing the current of an output terminal from flowing backward to an input terminal and the capacitor 140, a second diode element 134 connected between the second inductor 114 and the capacitor 140, and a third diode element 136 connected between the third inductor 116 and the capacitor 140.

The three-phase converter as configured above performs a switching operation with a phase delay of 120° (360°/the number of phases) and at the same switching frequency. Due to the above described configuration and switching method, the three-phase converter has the advantages of reducing the input current ripples, element current stress, element size and current rate, output voltage ripples, capacitor voltage stress, and the like. During the operation of the three-phase converter, periods where three-phase switching overlaps or does not overlap occur according to the duty thereof.

In a period where the three-phase switching overlaps, the size of the input current ripples linearly increases in the same manner as a general converter, while in other periods, the size of the input current ripples and the size of the output voltage ripples decrease at a specified rate, and the frequency increases to twice the number of phases.

Accordingly, in manufacturing converters, many developers frequently utilize multi-phase converters. However, there has been no special basis in determining the number of phases in a multi-phase converter. Accordingly, developers have properly selected the number of phases, e.g. three phases, four phases, or the like, according to their experiences or circumstances, and have manufactured converters having the selected number of phases.

SUMMARY OF THE INVENTION

Accordingly, the present invention has been made to solve the abovementioned problems occurring in the prior art, and an object of the present invention is to provide a method capable of selecting the optimum number of phases for a converter using input current ripples and output voltage ripples in manufacturing the converter, and a system using the same.

In order to accomplish this object, there is provided a method for selecting the optimum number of phases for a converter, according to the present invention, which includes a duty range selection step of selecting a duty range using an input voltage and an output voltage, a ripple value calculation step of obtaining ripple values for multiple phases within the selected duty range, and a phase selection step of obtaining the optimum number of phases by the obtained ripple values.

Preferably, the phase selection step comprises: a range ripple selection step of selecting one or more phases in the duty range; and a rated ripple selection step of selecting the phases having the minimum ripple value in a rated duty among the phases selected in the range ripple selection step.

More preferably, the rated ripple selection step further comprises a minimum unit cost selection step of selecting one or more phases and selecting the smallest number of phases among the phases selected in the rated ripple selection step.

Also, the ripple value includes at least one of an input current ripple value and an output voltage ripple value.

The ripple value calculation step may comprise: an input current ripple value calculation step of obtaining the input current ripple value for each phase; and an output voltage ripple value calculation step of obtaining the output voltage ripple value for each phase.

The input current ripple value calculation step may calculate the input current ripple values by $$\Delta I_{in} = \frac{V_o}{L}(N_{onsw} - ND)\frac{T}{N}d,$$

where $V_o$ denotes an output voltage, L denotes inductance, $N_{onsw}$ denotes the number of turned-on switches, N denotes the number of phases, D denotes a duty, T denotes a switching period of one phase, and d denotes a short period.

The output voltage ripple value calculation step may calculate the output voltage ripple values by the following equation, $$\Delta V_o = \frac{TV_o dd'}{RCN^2 D'},$$

where T denotes a switching period of one phase, R denotes resistance, $V_o$ denotes an output voltage, d denotes an on-duty for a short period, d' denotes an off-duty for a short period, C denotes capacitance, N denotes the number of phases, and D' denotes a system off duty.

The range ripple selection step may comprise the steps of: integrating the equation calculated for the respective phases in the input current ripple value calculation step, and selecting the phase numbers corresponding to the minimum integrated value among integrated values obtained for the respective phases; and selecting the phase numbers within a specified range from the phase numbers corresponding to the minimum integrated value.

The range ripple selection step may comprise the steps of: integrating the equation calculated for the respective phases in the output voltage ripple value calculation step, and selecting the phase numbers corresponding to the minimum integrated value among integrated values obtained for the respective phases; and selecting the phase numbers within a specified range from the phase numbers corresponding to the minimum integrated value.

Preferably, the duty range selection step calculates the duty range by the following equation, $$D = 1 - \frac{V_{in}}{V_o},$$

where D denotes a duty range, $V_o$ denotes an output voltage, and $V_{in}$ denotes an input voltage.

In accordance with another aspect of the present invention, as illustrated in FIG. 8, there is provided a system 800 for selecting the optimum number of phases for a converter, comprising: a duty range selection module 805 selecting a duty range using an input voltage and an output voltage; a ripple value calculation module 810 obtaining ripple values for multiple phases within the selected duty range; and a phase selection module 815 obtaining the optimum number of phases by the obtained ripple values.

The phase selection module 815 may comprise: a range ripple selection module 820 selecting one or more phases in the duty range; and a rated ripple selection module 825 selecting the phases having the minimum ripple value in a rated duty among the phases selected by the range ripple selection module.

The rated ripple selection module 825 may further comprise a minimum unit cost selection module 830 selecting one or more phases and selecting the smallest number of phases among the phases selected by the rated ripple selection module 825.

The ripple value may include at least one of an input current ripple value and an output voltage ripple value.

The converter may be a boost converter boosting a low-level DC voltage up to a DC voltage of a specified level.

In accordance with another aspect of the present invention, there is provided a computer-readable recording medium recorded with a program capable of performing: a duty range selection step of selecting a duty range using an input voltage and an output voltage; a ripple value calculation step of obtaining ripple values for multiple phases within the selected duty range; and a phase selection step of obtaining the optimum number of phases by the obtained ripple values.

According to the present invention as constructed above, the optimum number of phases can be selected using the input current ripples and the output voltage ripples in manufacturing a converter.

BRIEF DESCRIPTION OF THE DRAWINGS

The above and other objects, features and advantages of the present invention will be more apparent from the following detailed description taken in conjunction with the accompanying drawings, in which:

FIG. 5A is a view illustrating an example of input current ripple values in accordance with the number of phases according to an embodiment of the present invention;

DETAILED DESCRIPTION OF THE PREFERRED EMBODIMENTS

Figure 1:
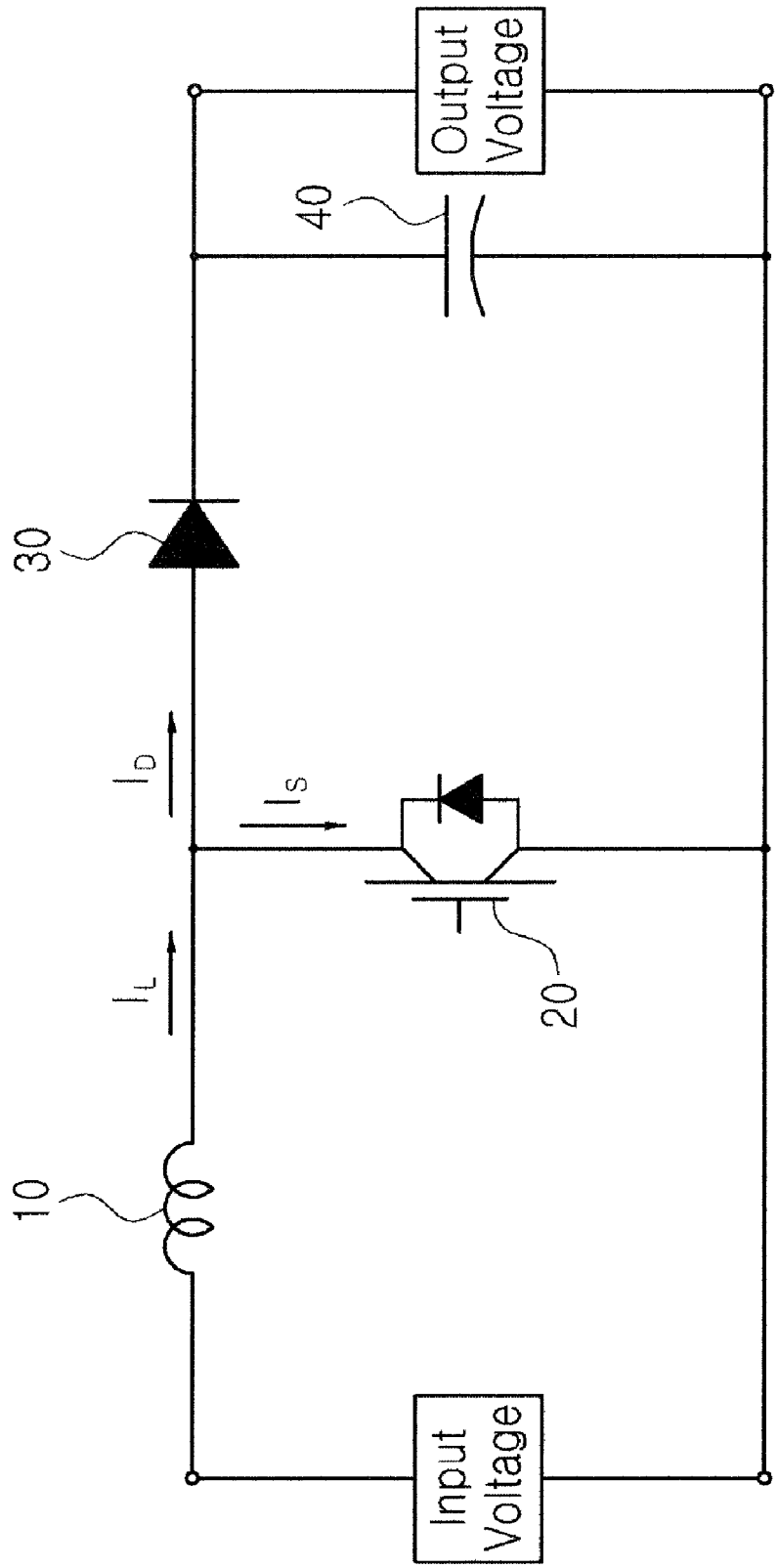
FIG. 1 is a view schematically illustrating the configuration of a conventional single-phase boost converter.
Figure 2:
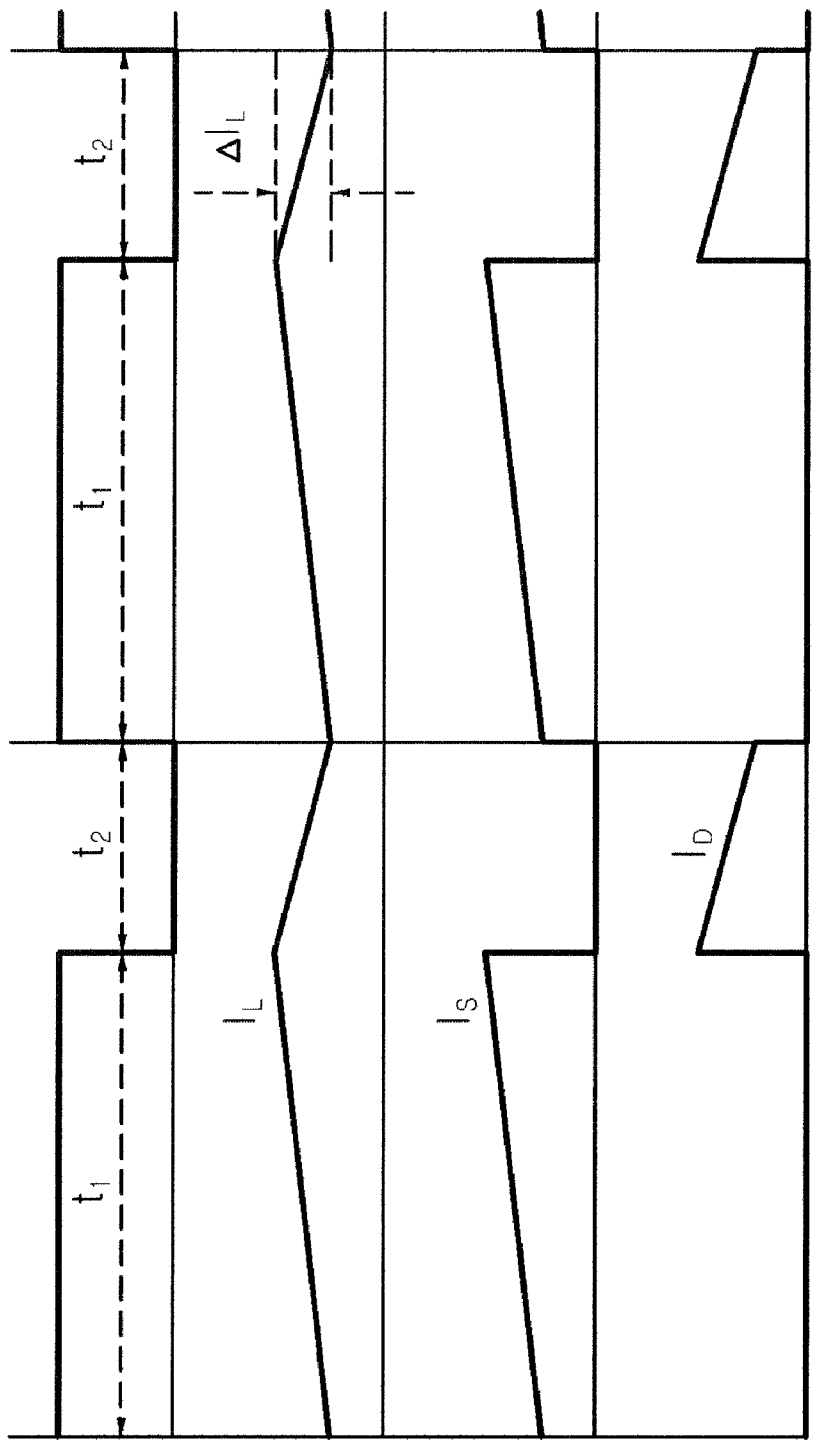
FIG. 2 is a view explaining the operation of the converter illustrated in FIG. 1.
Figure 3:
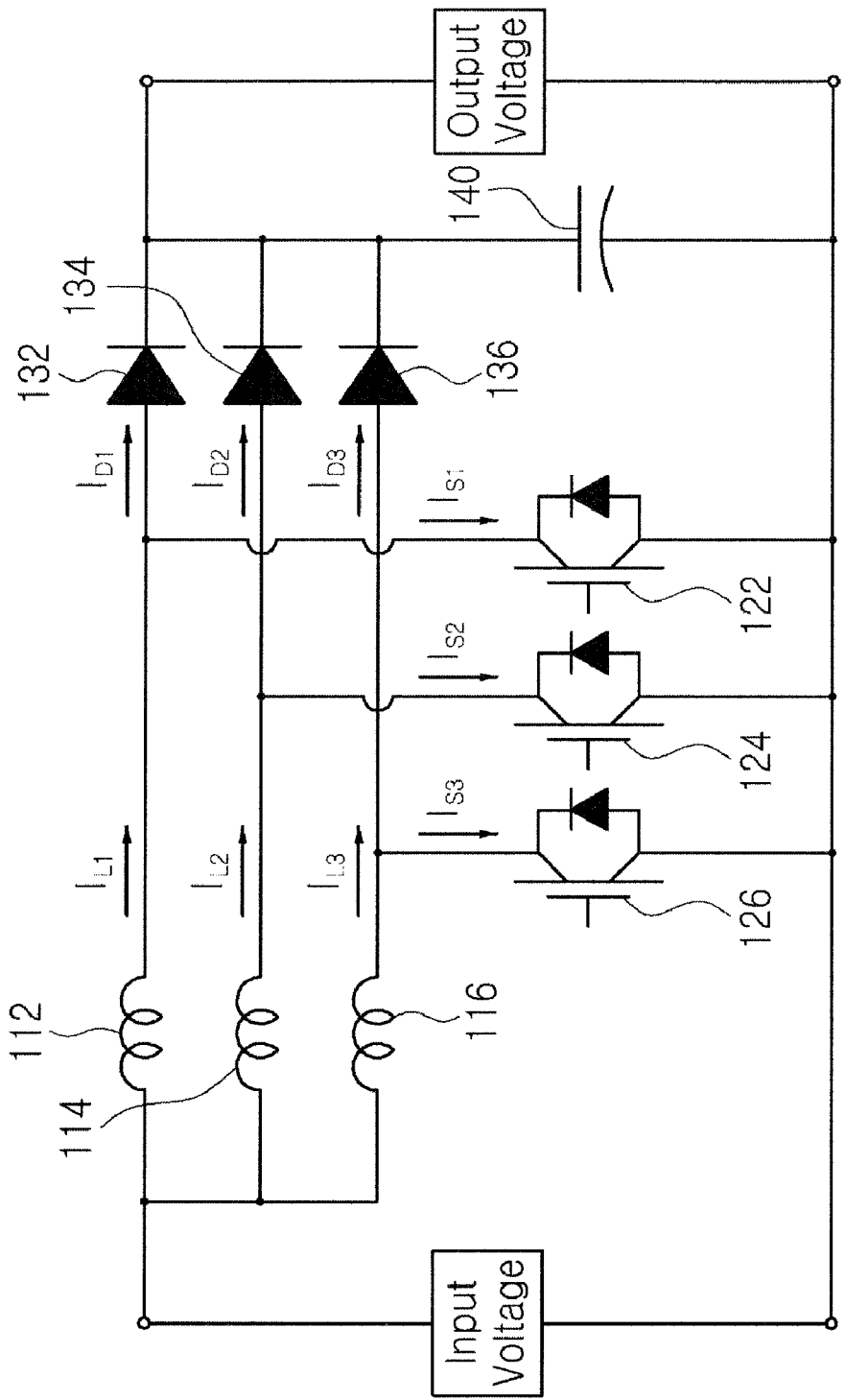
FIG. 3 is a view schematically illustrating the configuration of a general three-phase boost converter.

Hereinafter, the preferred embodiment of the present invention will be described with reference to the accompanying drawings. In the following description and drawings, the same reference numerals are used to designate the same or similar components, and so repetition of the description of the same or similar components will be omitted.

Figure 4:
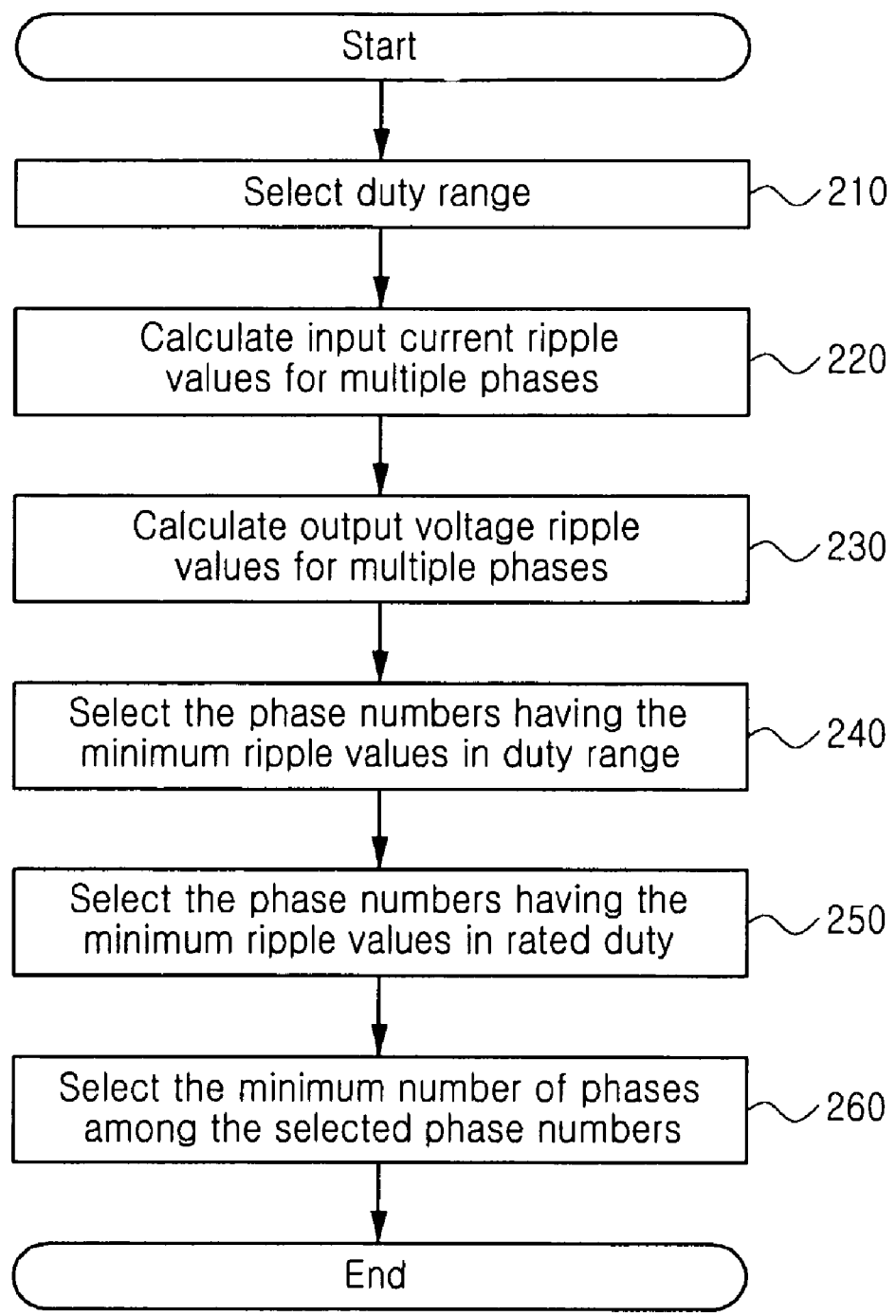
FIG. 4 is a flowchart illustrating a method for selecting the optimum number of phases for a converter according to an embodiment of the present invention.

FIG. 4 is a flowchart illustrating a method for selecting the optimum number of phases for a converter according to an embodiment of the present invention.

First, a duty range is selected on the basis of an input voltage value and an output voltage value (step S210).

As the input voltage value and the output voltage value can be known, the duty range is obtained by Equation (1) below. Generally, in the case where the input power source is photovoltaic fuel cells that correspond to new and renewable energy in manufacturing a converter, the input voltage value is not a single value, but a range of values. Accordingly, the duty value obtained by the equation is not a single value, but a range of values.

$$D = 1 - \frac{V_{in}}{V_o} \quad (1)$$

Here, D denotes a duty range, $V_o$ denotes an output voltage, and $V_{in}$ denotes an input voltage.

Then, input current ripple values are calculated (step S220).

The input current ripple values are obtained by Equation (2) in the form of a graph in accordance with the number of phases.

$$\Delta I_{in} = \frac{V_o}{L}(N_{onsw} - ND)\frac{T}{N}d \quad (2)$$

Here, $V_o$ denotes an output voltage, L denotes inductance, $N_{onsw}$ denotes the number of turned-on switches, N denotes the number of phases, D denotes a duty, T denotes a switching period of one phase, and d denotes a short period. Since the respective variables are easily known to a person of ordinary skill in the art, the detailed description thereof will be omitted.

An example of the input current ripple values obtained using Equation (2) is illustrated in FIG. 5A.

As illustrated in FIG. 5A, the duty range is 0.45-0.7, and the rated duty is 0.7. The input current ripple values are calculated as the number of phases N is changed from '1' to '5,' i.e. from one phase to five phases. There is no special limitation in determining the number of phases N. For example, a user, who intends to obtain the optimum number of phases among 1~100, can input 1~100 as the number of phases N.

Thereafter, output voltage ripple values are calculated (step S230).

The output voltage ripple values are obtained by Equation (3) in the form of a graph in accordance with the number of phases.

$$\Delta V_o = \frac{TV_o dd'}{RCN^2 D'} \quad (3)$$

Here, T denotes a switching period of one phase, R denotes resistance, $V_o$ denotes an output voltage, d denotes an on-duty for a short period, d' denotes an off-duty for a short period, C denotes capacitance, N denotes the number of phases, and D' denotes a system off duty. Since the respective variables are easily known to a person of ordinary skill in the art, the detailed description thereof will be omitted.

Figure 5B:
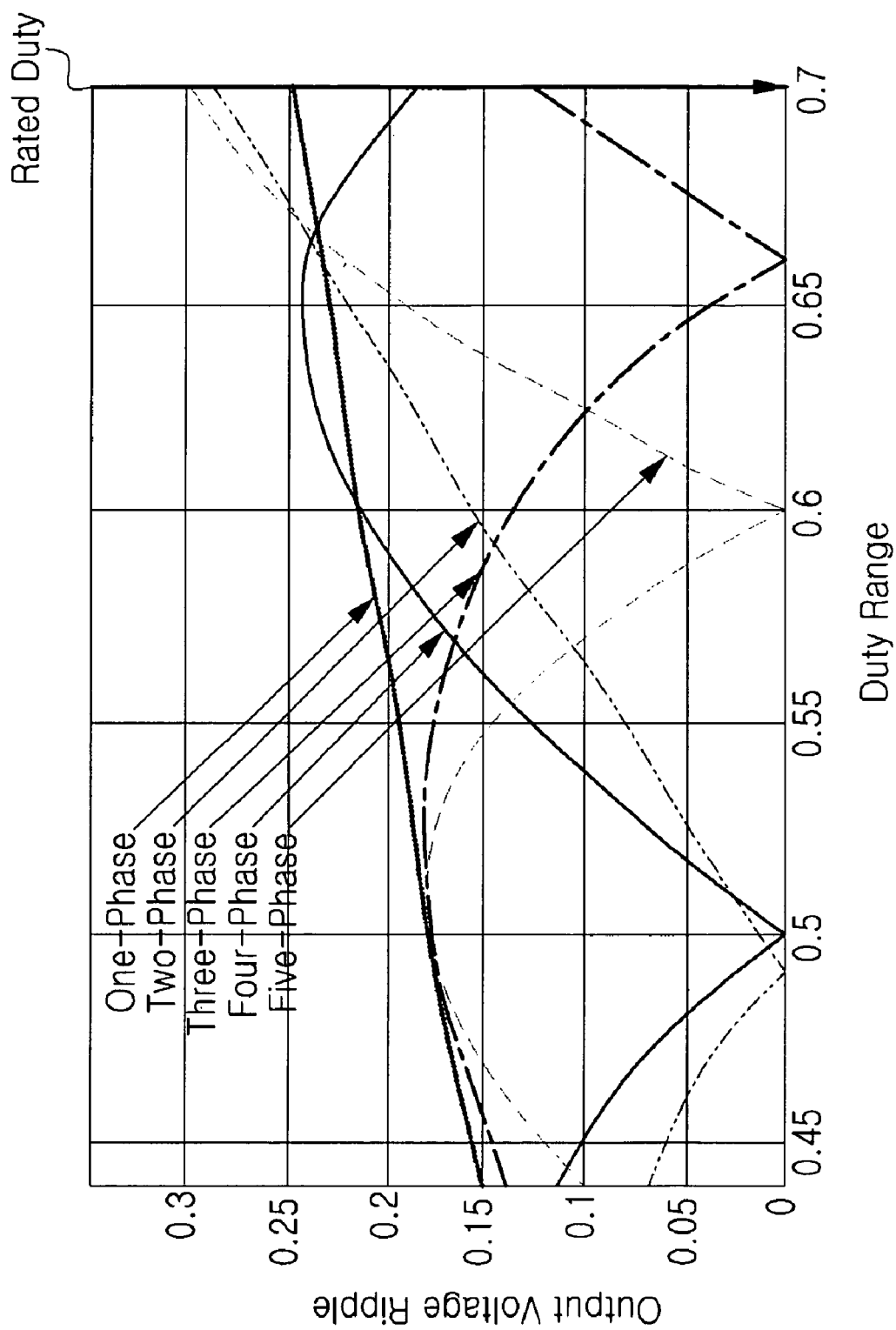
FIG. 5B is a view illustrating an example of output voltage ripple values in accordance with the number of phases according to an embodiment of the present invention

An example of the output voltage ripple values obtained using Equation (3) is illustrated in FIG. 5B.

After the ripple values are obtained for the respective phase numbers, the phase numbers, whereby the ripple value becomes minimized in the duty range, are selected (step S240).

For reference, since the input current ripple value and the output voltage ripple value are correlated with each other, either of them may be calculated, or the average value of them.

For example, in view of the input current ripple values, three-phase, four-phase, and five-phase are selected as the phase numbers having the smallest input current ripple value in the duty range. Although several phase selection methods may be possible, it is preferable to use a method of integrating Equation (2) or (3) calculated for the respective phases within the duty range and extracting the phase numbers corresponding to the minimum integrated value.

After the three phase numbers are selected, the phase number having the minimum ripple value in the rated duty is selected (step S250).

In the embodiment of the present invention, three-phase and four-phase are selected as the phase numbers having the smallest ripple value among three-phase, four-phase, and five-phase.

Then, the smallest phase number among the selected phase numbers is selected (step S260). The phases selected by the step S250 are performed almost similarly in reducing the ripples, and so the smallest phase number is selected in consideration of manufacturing costs. In the embodiment of the present invention, three-phase is selected between three-phase and four-phase.

Accordingly, a three-phase converter is manufactured as an optimum converter having the minimum ripple value.

Figure 6:
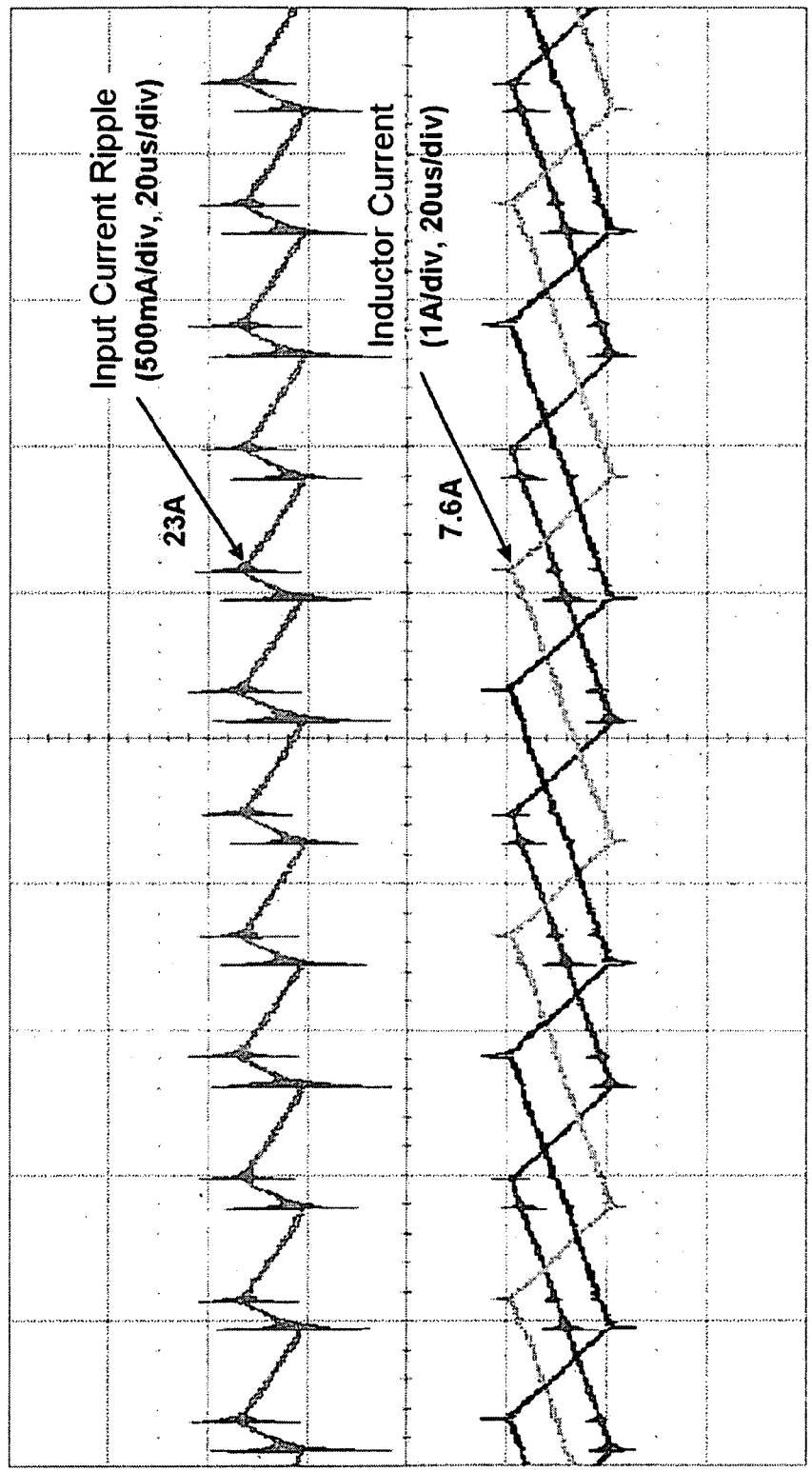
FIGS. 6 and 7 are views experimentally explaining that ripples are minimized in a converter selected by the method according to the present invention.
Figure 7:
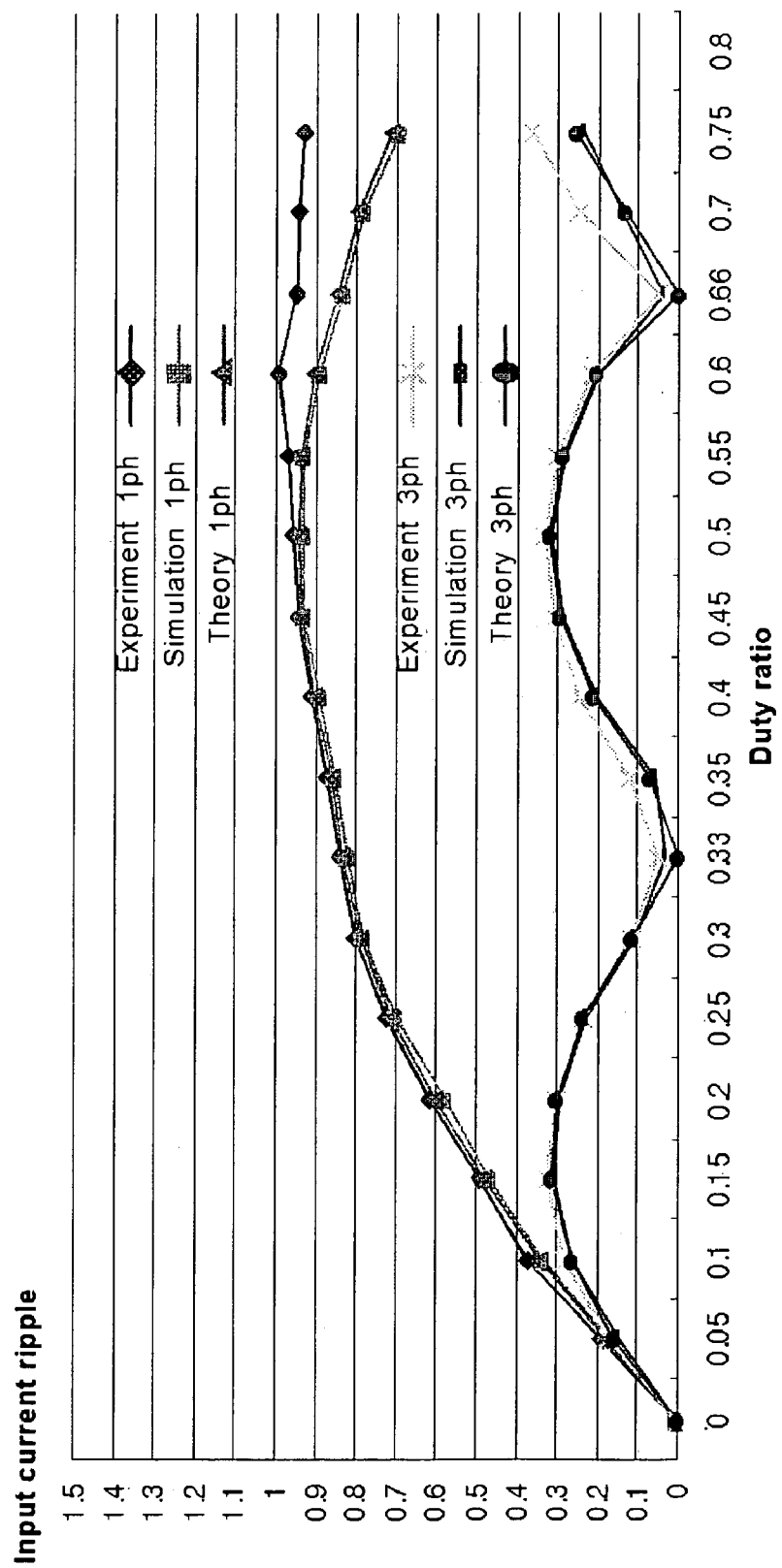
Figure 8:
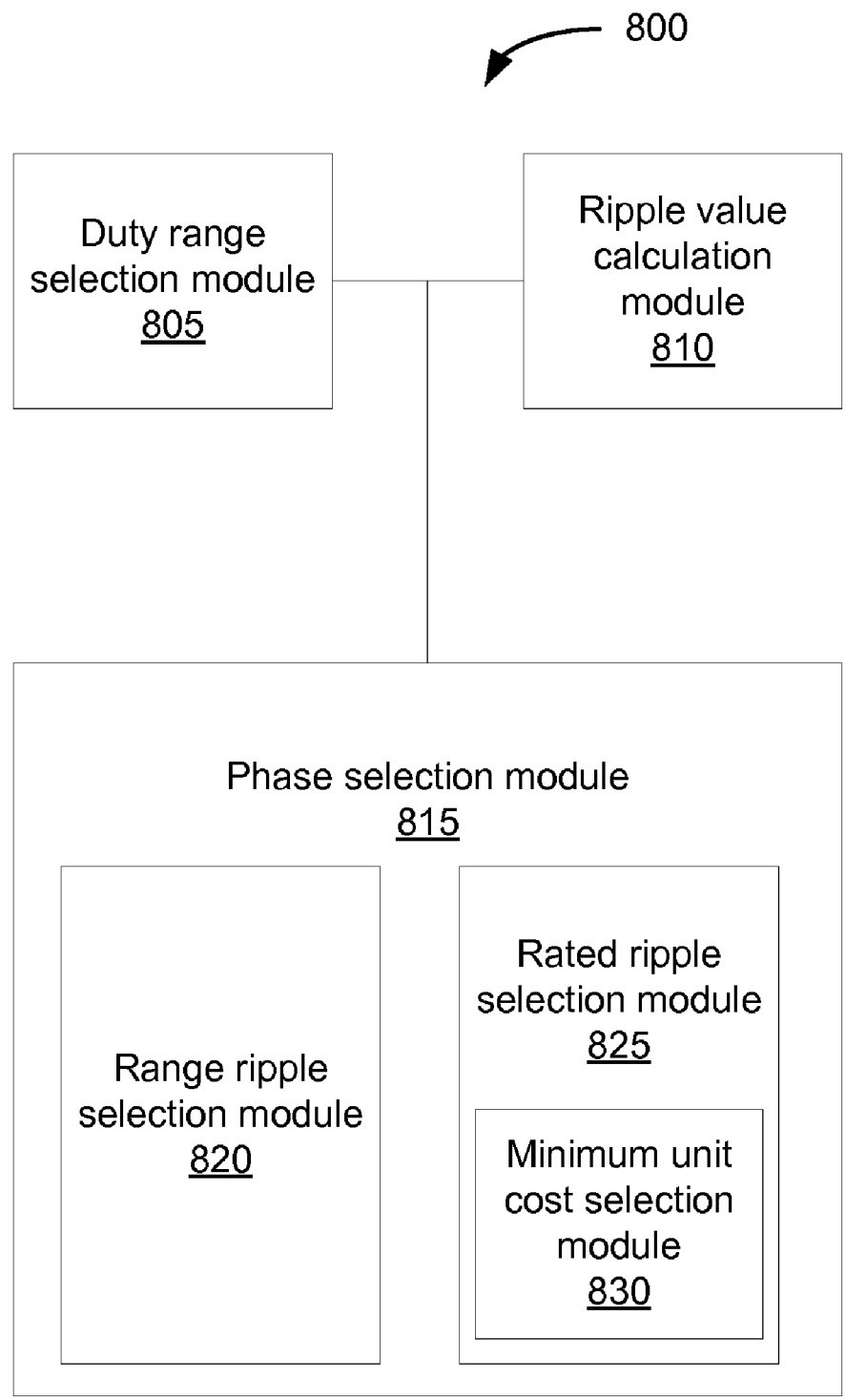
FIG. 8 illustrates an exemplary system for selecting the optimum number of phases for a converter.

FIGS. 6 and 7 are views experimentally explaining that ripples are minimized in a converter selected by the method according to the present invention.

FIG. 6 shows input current ripples and inductor current of a three-phase boost converter. In FIG. 6, it can be experimentally seen that the input current ripple becomes minimized at a rate that is a part of a selection algorithm. The inductor currents have a phase difference of 120°, and the sum of three inductor currents becomes the input current.

FIG. 7 shows the change of the input current ripple (y-axis) as the duty (x-axis) is changed through theory, simulation, and experiment in comparing the experimental waveforms between a one-phase and three-phase. Accordingly, it can be known that the number of phases selected according to the algorithm has the minimum ripple of the input current and the output voltage.

In the embodiment of the present invention, the selection of three phases having the minimum ripple value is exemplified. However, this is only for convenience in explanation, and the number of phases is not limited to three. The number of phases may be changed and it is also possible to select one phase having the minimum ripple value and then to select all the phase numbers in a predetermined range.

Also, in the embodiment of the present invention, two phases having the minimum ripple value in the rated duty are selected. However, the number of phases is not limited to two, and it is also possible to obtain the phase having the minimum value and then to obtain all the phases in a predetermined range. It is also possible to select one phase having the smallest value and to select this phase as the optimum phase.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for selecting an optimum number of phases for a converter, comprising:
   selecting a duty range using an input voltage and an output voltage;
   obtaining ripple values for multiple phases within the selected duty range, wherein obtaining ripple values for multiple phases within the selected duty range comprises obtaining an input current ripple value for each phase, and wherein the obtaining the input current ripple value for each phase includes calculating the input current ripple values by the following equation, $$\Delta I_{in} = \frac{V_o}{L}(N_{onsw} - ND)\frac{T}{N}d,$$

where $V_o$ denotes the output voltage, L denotes inductance, $N_{onsw}$ denotes a number of turned-on switches, N denotes a number of phases, D denotes a duty, T denotes a switching period of one phase, and d denotes a short period; and
   obtaining the optimum number of phases based upon the obtained ripple values by selecting one or more phases in the duty range and selecting the phases having a minimum ripple value in a rated duty among the selected one or more phases, wherein the selecting one or more phases in the duty range comprises integrating the equation calculated for the respective phases in the obtaining the input current ripple value for each phase, selecting the phase numbers corresponding to a minimum integrated value among integrated values obtained for the respective phases, and selecting the phase numbers within a specified range from the phase numbers corresponding to the minimum integrated value.

2. The method as claimed in claim 1, wherein the selecting the phases having the minimum ripple value in the rated duty among the selected one or more phases comprises selecting one or more phases and selecting the smallest number of phases among the selected one or more phases.

3. The method as claimed in claim 2, wherein the ripple value includes an output voltage ripple value.

4. The method as claimed in claim 3, wherein the obtaining ripple values for multiple phases within the selected duty range further comprises:
   obtaining the output voltage ripple value for each phase.

5. The method as claimed in claim 4, wherein the obtaining the output voltage ripple value for each phase includes calculating the output voltage ripple values by the following equation, $$\Delta V_o = \frac{TV_o dd'}{RCN^2 D'},$$

where T denotes the switching period of one phase, R denotes resistance, $V_o$ denotes the output voltage, d denotes an on-duty for a short period, d' denotes an off-duty for the short period, C denotes capacitance, N denotes the number of phases, and D' denotes a system off duty.

6. The method as claimed in claim 5, wherein the selecting one or more phases in the duty range comprises:
   integrating the equation calculated for the respective phases in the obtaining the output voltage ripple value for each phase, and selecting the phase numbers corresponding to the minimum integrated value among integrated values obtained for the respective phases; and
   selecting the phase numbers within a specified range from the phase numbers corresponding to the minimum integrated value.

7. The method as claimed in claim 1, wherein the selecting the duty range using the input voltage and the output voltage includes calculating the duty range by the following equation, $$D = 1 - \frac{V_{in}}{V_o},$$

where D denotes the duty range, $V_o$ denotes the output voltage, and $V_{in}$ denotes the input voltage.

8. A system for selecting an optimum number of phases for a converter, comprising:
   a duty range selection module selecting a duty range using an input voltage and an output voltage;
   a ripple value calculation module obtaining ripple values for multiple phases within the selected duty range, wherein obtaining ripple values for multiple phases within the selected duty range comprises obtaining an input current ripple value for each phase, and wherein the obtaining the input current ripple value for each phase includes calculating the input current ripple values by the following equation, $$\Delta I_{in} = \frac{V_o}{L}(N_{onsw} - ND)\frac{T}{N}d,$$

where $V_o$ denotes the output voltage, L denotes inductance, $N_{onsw}$ denotes a number of turned-on switches, N denotes a number of phases, D denotes a duty, T denotes a switching period of one phase, and d denotes a short period; and a phase selection module obtaining the optimum number of phases based upon the obtained ripple values by selecting one or more phases in the duty range and selecting the phases having a minimum ripple value in a rated duty among the selected one or more phases, wherein the selecting one or more phases in the duty range comprises integrating the equation calculated for the respective phases in the obtaining the input current ripple value for each phase, selecting the phase numbers corresponding to a minimum integrated value among integrated values obtained for the respective phases, and selecting the phase numbers within a specified range from the phase numbers corresponding to the minimum integrated value.

9. The system as claimed in claim 8, wherein selecting the phases having the minimum ripple value in the rated duty among the phases selected by the range ripple selection module comprises selecting one or more phases and selecting the smallest number of phases among the selected one or more phases.

10. The system as claimed in claim 9, wherein the ripple value includes an output voltage ripple value.

11. The system as claimed in claim 10, wherein the converter is a boost converter boosting a low-level DC voltage up to a DC voltage of a specified level.

12. A computer-readable recording medium recorded with a program capable of performing:

selecting a duty range using an input voltage and an output voltage;

obtaining ripple values for multiple phases within the selected duty range, wherein obtaining ripple values for multiple phases within the selected duty range comprises obtaining an input current ripple value for each phase, and wherein the obtaining the input current ripple value for each phase includes calculating the input current ripple values by the following equation, $$\Delta I_{in} = \frac{V_o}{L}(N_{onsw} - ND)\frac{T}{N}d,$$

where $V_o$ denotes the output voltage, L denotes inductance, $N_{onsw}$ denotes a number of turned-on switches, N denotes a number of phases, D denotes a duty, T denotes a switching period of one phase, and d denotes a short period; and obtaining an optimum number of phases based upon the obtained ripple values by selecting one or more phases in the duty range and selecting the phases having a minimum ripple value in a rated duty among the selected one or more phases, wherein the selecting one or more phases in the duty range comprises integrating the equation calculated for the respective phases in the obtaining the input current ripple value for each phase, selecting the phase numbers corresponding to a minimum integrated value among integrated values obtained for the respective phases, and selecting the phase numbers within a specified range from the phase numbers corresponding to the minimum integrated value.

13. The recording medium as claimed in claim 12, wherein the selecting the phases having the minimum ripple value in the rated duty among the selected one or more phases comprises selecting one or more phases and selecting the smallest number of phases among the selected one or more phases.

\* \* \* \* \*